US007240757B2

(12) United States Patent
Ueda et al.

(10) Patent No.: US 7,240,757 B2
(45) Date of Patent: Jul. 10, 2007

(54) CONTROL SYSTEM OF SELF PROPELLED INDUSTRIAL MACHINE

(75) Inventors: Katsumi Ueda, Tokyo (JP); Yoshihide Iwamoto, Tokyo (JP); Toru Saito, Tokyo (JP)

(73) Assignees: Mitsubishi Heavy Industries, Ltd., Tokyo (JP); Nissan Motor Co., Ltd., Kanagawa (JP)

( * ) Notice: Subject to any disclaimer, the term of this patent is extended or adjusted under 35 U.S.C. 154(b) by 416 days.

(21) Appl. No.: 10/855,437

(22) Filed: May 28, 2004

(65) Prior Publication Data

US 2004/0256168 A1 Dec. 23, 2004

(30) Foreign Application Priority Data

May 29, 2003 (JP) ............................ 2003-153304

(51) Int. Cl.
*B60K 28/04* (2006.01)

(52) U.S. Cl. ..................................................... 180/273

(58) Field of Classification Search ................ 180/272, 180/273

See application file for complete search history.

(56) References Cited

U.S. PATENT DOCUMENTS 1,409,202 A * 3/1922 Sabattier ..................... 180/273
2,564,002 A 8/1951 Gibson
2,911,053 A * 11/1959 Ayers et al. ................ 180/273
3,265,150 A * 8/1966 Westmann .................. 180/273
3,507,350 A * 4/1970 Boyajian .................... 180/273
3,700,062 A * 10/1972 Garnett ....................... 180/273
4,019,602 A 4/1977 Habiger
4,091,889 A * 5/1978 Brown et al. ............... 180/273
4,136,752 A * 1/1979 Friesen et al. .............. 180/273
4,221,277 A * 9/1980 Mastropieri ................. 180/273
4,355,698 A * 10/1982 Barnes et al. ............... 180/273
4,383,412 A 5/1983 Presley
4,392,543 A * 7/1983 Buckhouse et al. ......... 180/272
4,398,618 A * 8/1983 Hansen ....................... 180/273
4,883,137 A * 11/1989 Wanie et al. .............. 180/6.34
5,109,945 A 5/1992 Koga
5,203,440 A * 4/1993 Peterson et al. ............ 477/171
5,577,876 A 11/1996 Haeder et al.

(Continued)

FOREIGN PATENT DOCUMENTS

CN 1219498 A 6/1999

(Continued)

OTHER PUBLICATIONS

U.S. Patent Application entitled "Control System of Industrial Truck and Controlling Method of the Same", Takuya Nakada et al.

*Primary Examiner*—Paul N. Dickson
*Assistant Examiner*—Laura B. Freedman
(74) *Attorney, Agent, or Firm*—Wenderoth, Lind and Ponack, L.L.P.

(57) ABSTRACT

A self propelled industrial machine includes a self propelled vehicle body, a transmission installed in the self propelled vehicle body, an operator presence detection switch and a control unit. The operator presence detection switch is provided to generate an operator presence or absence signal relating to an operator on a seat arranged on the self propelled vehicle body. The control unit is provided to set the transmission to a neutral state in response to the operator absence signal.

10 Claims, 8 Drawing Sheets

U.S. PATENT DOCUMENTS

| | | | |
|---|---|---|---|
| 6,092,976 | A | 7/2000 | Kamiya |

FOREIGN PATENT DOCUMENTS

| | | | | |
|---|---|---|---|---|
| DE | 25 48 856 | | | 5/1977 |
| JP | 64-13398 | | | 1/1989 |
| JP | 06137423 | A | * | 5/1994 |
| JP | 11-193866 | | | 7/1999 |
| JP | 2002-181186 | | | 6/2002 |

* cited by examiner

CONTROL SYSTEM OF SELF PROPELLED INDUSTRIAL MACHINE

CROSS REFERENCE

The present invention relates to U.S. patent application Ser. No. 10/855,442 entitled "CONTROL SYSTEM OF INDUSTRIAL TRUCK AND CONTROLLING METHOD OF THE SAME" and claiming a priority based on Japanese Patent Application No. 2003-153840. The disclosures of these references are incorporated herein by reference.

BACKGROUND OF THE INVENTION

1. Field of the Invention

The present invention relates to a control system of a self propelled industrial machine like a forklift.

2. Description of the Related Art

A self propelled industrial machine such as a forklift and a truck crane works to lift or move an object. Such a self propelled industrial machine is different from an automobile, and severe conditions are required in driving operations. In the self propelled industrial machine, it is required that an operator carries out a machine work control operation and a running control operation, while confirming the loaded object, a road and a working place, and a running state of the industrial machine. Thus, control operations other than the running control operation are required in consideration of conditions such as an operator posture of the operator.

A self propelled vehicle body of the self propelled industrial machine does not have a cover in any portion other than a driving seat, and the operator sometimes stands up from the seat and moreover leaves the seat to check a working environment or a machine element.

A conventional safety mechanism to protect the operator who leaves the driving seat is known in Japanese Laid Open Patent Application (JP-A-Heisei 64-13398). In this conventional example, a seat switch is arranged in the seat in a forklift, and the drive state of a motor is controlled based on the seat switch.

As conventional running control techniques, an electric control system is known in which solenoids are operated in accordance with electric switches to control a drive section. In addition, a mechanical control system is known in which a control valve is controlled through the drive of a hydraulic pressure unit which is mechanically connected with a lever handle. In the self propelled industrial machine, it is required to cope with any trouble of the electric control system. Also, in the self propelled industrial machine, the operator is required to carry out various machine control operations. Therefore, automation of the running control and safety control are especially required.

Also, in the self propelled industrial machine, a phenomenon known as creep occurs, in which a part of the engine torque is transferred to a transmission so that the self propelled industrial machine runs when a forward direction movement switch is in a neutral position in an idling state.

A conventional running control technique for restraining the creep phenomenon is known in Japanese Laid Open Patent Application (JP-P2002-181186A). In this conventional example, a neutral control section carries out a neutral control to keep a friction coupling element to a sliding state when an automatic transmission is in a running range and a predetermined condition is satisfied. When the neutral state is cancelled through generation of the velocity of a car, the neutral control section prohibits the neutral control until an acceleration pedal is footed.

Also, a running control technique for restraining the creep phenomenon in relation with vehicle velocity is known in Japanese Laid Open Patent Application (JP-A-Heisei 11-193866). In the conventional example, a neutral control unit sets an automatic transmission to a neutral state when predetermined conditions are satisfied even if the shift range of the automatic transmission is in a forward direction running range. The conditions are as follows: (a) an acceleration opening is smaller than a predetermined value, (b) a brake is footed, (c) a downshift is carried out, and (d) a velocity is smaller than a predetermined velocity. When all the conditions are satisfied, the automatic transmission is set to the neutral state.

SUMMARY OF THE INVENTION

An object of the present invention is to provide a control system of a self propelled industrial machine in which safety in a forward direction movement, a rear direction movement and a neutral state is enhanced.

Another object of the present invention is to provide a control system of a self propelled industrial machine in which an electric system and a mechanical system work surely in a safety direction.

Another object of the present invention is to provide a control system of a self propelled industrial machine in which an operation is controlled in a safety direction based on a vehicle velocity.

Another object of the present invention is to provide a control system of a self propelled industrial machine in which creep running can be restrained.

In an aspect of the present invention, a self propelled industrial machine includes a self propelled vehicle body, a transmission installed in the self propelled vehicle body, an operator presence detection switch and a control unit. The operator presence detection switch is provided to generate an operator presence or absence signal relating to an operator on a seat arranged on the self propelled vehicle body. The control unit is provided to set the transmission to a neutral state in response to the operator absence signal.

Here, the operator presence signal may be active during a period while the operator is on the seat and a predetermined period after the operator leaves the seat, and the operator absence signal may be active when the operator presence signal is inactive.

Also, the control unit may set a transmission lock state in response to the operator absence signal and sets the transmission to the neutral state when the transmission lock state is set. In this case, the operator presence signal may be active during a period while the operator is on the seat and a predetermined period after the operator leaves the seat, and the operator absence signal may be active when the operator presence signal is inactive. Also, the self propelled industrial machine may further include a velocity sensor (24) provided to detect a velocity of the self propelled vehicle body. The control unit compares the detected velocity and a first predetermined velocity, and sets the transmission lock state when the detected velocity is smaller than the first predetermined velocity.

Also, the control unit may include an engine signal generator provided to generate an engine signal when an engine is started or an acceleration pedal is not footed. The control unit sets the transmission to the neutral state in response to the engine signal when the detected velocity is smaller than a second predetermined velocity. In this case, the first predetermined velocity may be smaller than the second predetermined velocity.

Also, the self propelled industrial machine may further include a first switch provided to instruct a forward direction movement, a second switch provided to instruct the neutral state, and a third switch provided to instruct a rear direction movement. The control unit sets the transmission to the neutral state when the second switch is turned on, the first to third switches are all turned off, and the first and third switched are turned on with the second switch being turned off or in a undefined state. In this case, the control unit may control the transmission such that the forward or rear direction movement is carried out, when the first switch or the third switch is turned on and the second switch is turned off or in an undefined state.

In another aspect of the present invention, a control method in a self propelled industrial machine with a self propelled vehicle body and a transmission, may be achieved by generating an operator presence or absence signal relating to an operator on a seat arranged on a self propelled vehicle body, and by setting the transmission to a neutral state in response to the operator absence signal.

Here, the operator presence signal may be active during a period while the operator is on the seat and a predetermined period after the operator leaves the seat, and the operator absence signal may be active when the operator presence signal is inactive.

Also, the setting may be achieved by setting a transmission lock state in response to the operator absence signal, and by setting the transmission to the neutral state when the transmission lock state is set. In this case, the operator presence signal is active during a period while the operator is on the seat and a predetermined period after the operator leaves the seat, and the operator absence signal is active when the operator presence signal is inactive.

Also, the control method may further include detecting a velocity of the self propelled vehicle body. The setting may be achieved by comparing the detected velocity and a first predetermined velocity, and by setting the transmission lock state when the detected velocity is smaller than the first predetermined velocity.

Also, the control method may further include generating an engine signal when an engine is started or an acceleration pedal is not footed. The setting may be achieved by setting the transmission to the neutral state in response to the engine signal when the detected velocity is smaller than a second predetermined velocity. In this case, the first predetermined velocity may be smaller than the second predetermined velocity.

Also, the control method may further include generating a forward direction movement instruction, generating a neutral state instruction, and generating a rear direction movement instruction. The setting may be achieved by setting the transmission to the neutral state when (a) the a neutral state instruction is generated, (b) the forward and rear direction movement instructions are not generated and the neutral state instruction is not generated, or (c) the forward and rear direction movement instructions are generated and the neutral state instruction is not generated. In this case, the transmission may be controlled in response to the forward and rear direction movement instructions, when the forward and rear direction movement instructions are generated and the neutral state instruction is not generated or in an undefined state.

DETAILED DESCRIPTION OF THE PREFERRED EMBODIMENTS

Hereinafter, a control system of a self propelled industrial machine according to the present invention will be described in detail with to the attached drawings.

Figure 1:
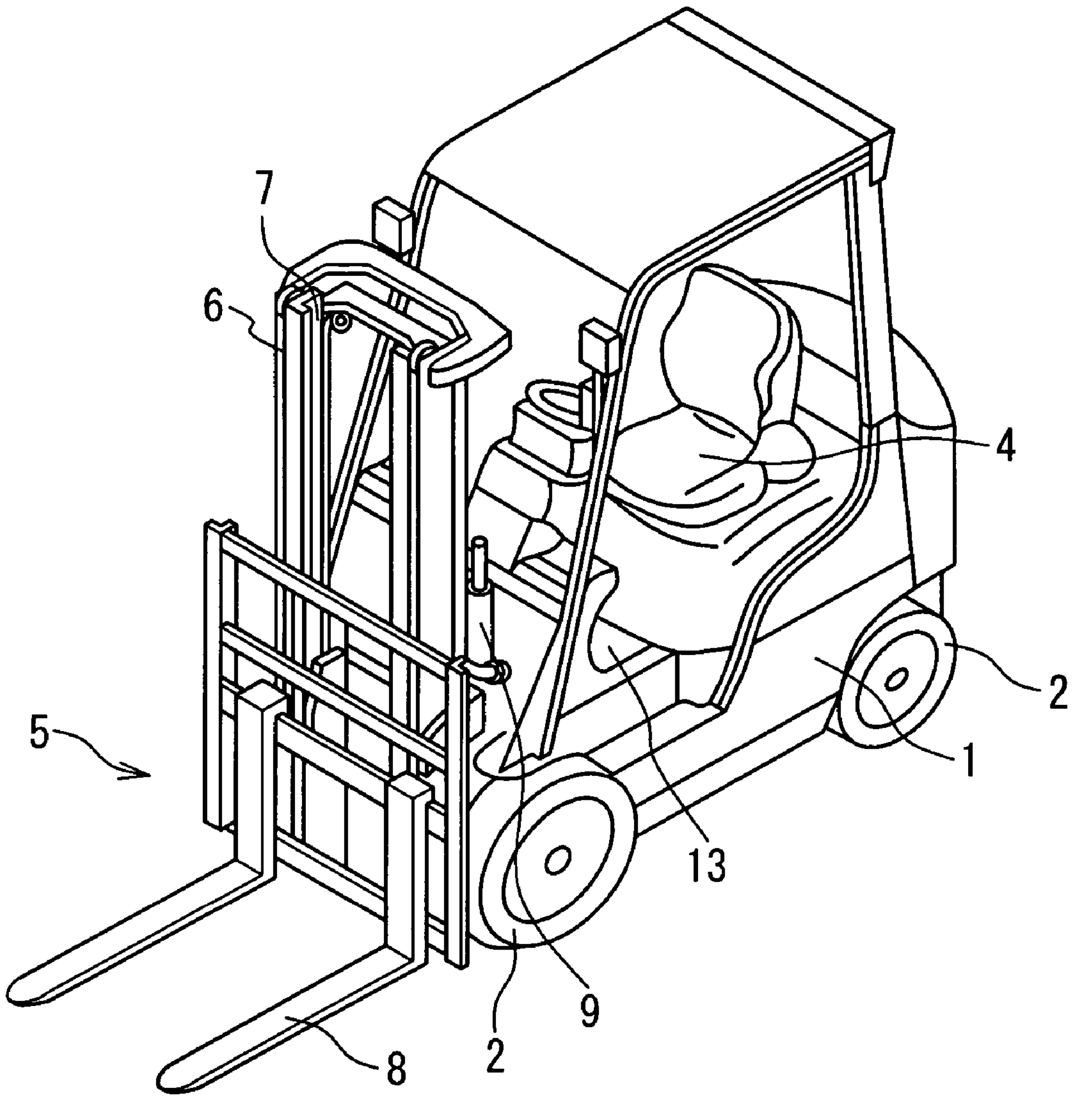
FIG. 1 is a perspective view showing a forklift as an example of a self propelled industrial machine according to the present invention.

FIG. 1 shows a forklift to which the control system of the self propelled industrial machine according to the present invention is applied. Referring to FIG. 1, the self propelled industrial machine is provided with a self propelled vehicle body 1, a work section and a seat 4. The self propelled vehicle body 1 is supported on road plane by driving wheels 2. The driving wheels 2 may be supported on the road plane through caterpillars, or may be directly supported on the road plane.

The seat 4 on which a driver or operator sits is arranged at a proper portion of the self propelled vehicle body 1. A leg putting base 13 is arranged in front of the seat 4 on a position lower than the seat 4 in the self propelled vehicle body 1, such that the legs of the operator are put when the operator sits and the operator is supported when the operator stands up.

A fork elevator 5 as a work section is attached to a front portion of the self propelled vehicle body 1. The fork elevator 5 is composed of outer masts 6, inner masts 7 moving up and down in a vertical direction while being guided by the outer masts 6, and a fork 8 supported by the inner mast 7 and moving up and down with the inner masts 7. The inner masts 7 are driven to the up and down directions by a lift cylinder 9.

Figure 2:
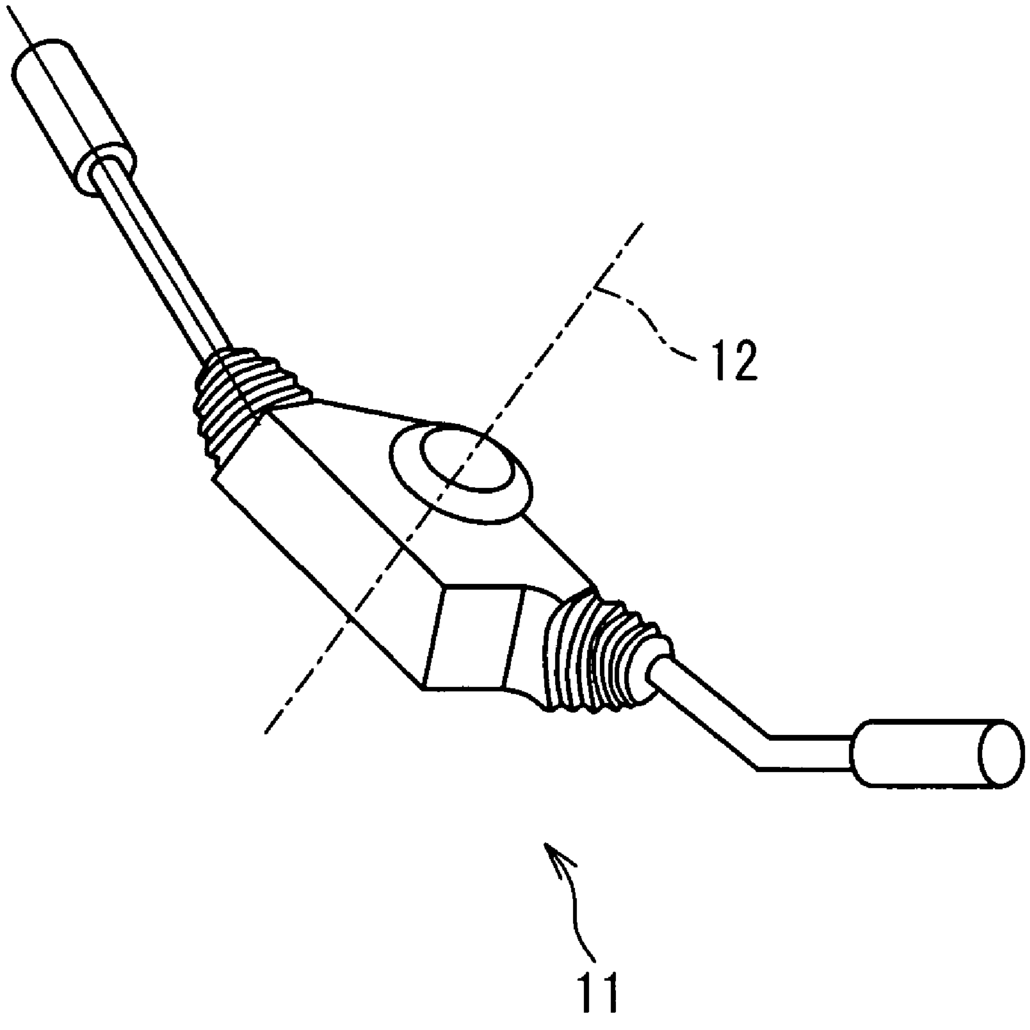
FIG. 2 is a perspective view showing an operation lever for forward direction movement/neutral state/rear direction movement used in the forklift.

A selection lever 11 shown in FIG. 2 is arranged in a front portion of the seat 4. The selection lever 11 can set a forward direction movement F and a rear direction movement R, and can stably stop the self propelled vehicle body 1 in a neutral state N. Also, the selection lever 11 can set a velocity of the self propelled vehicle 1.

The self propelled vehicle body 1 is provided with a controller, an automatic transmission (T/M), a hydraulic control unit with control valves for the transmission, a velocity sensor, switches with solenoids, an acceleration pedal, and an idle switch (all not shown in FIG. 1) in the self propelled vehicle body 1.

Figure 3:
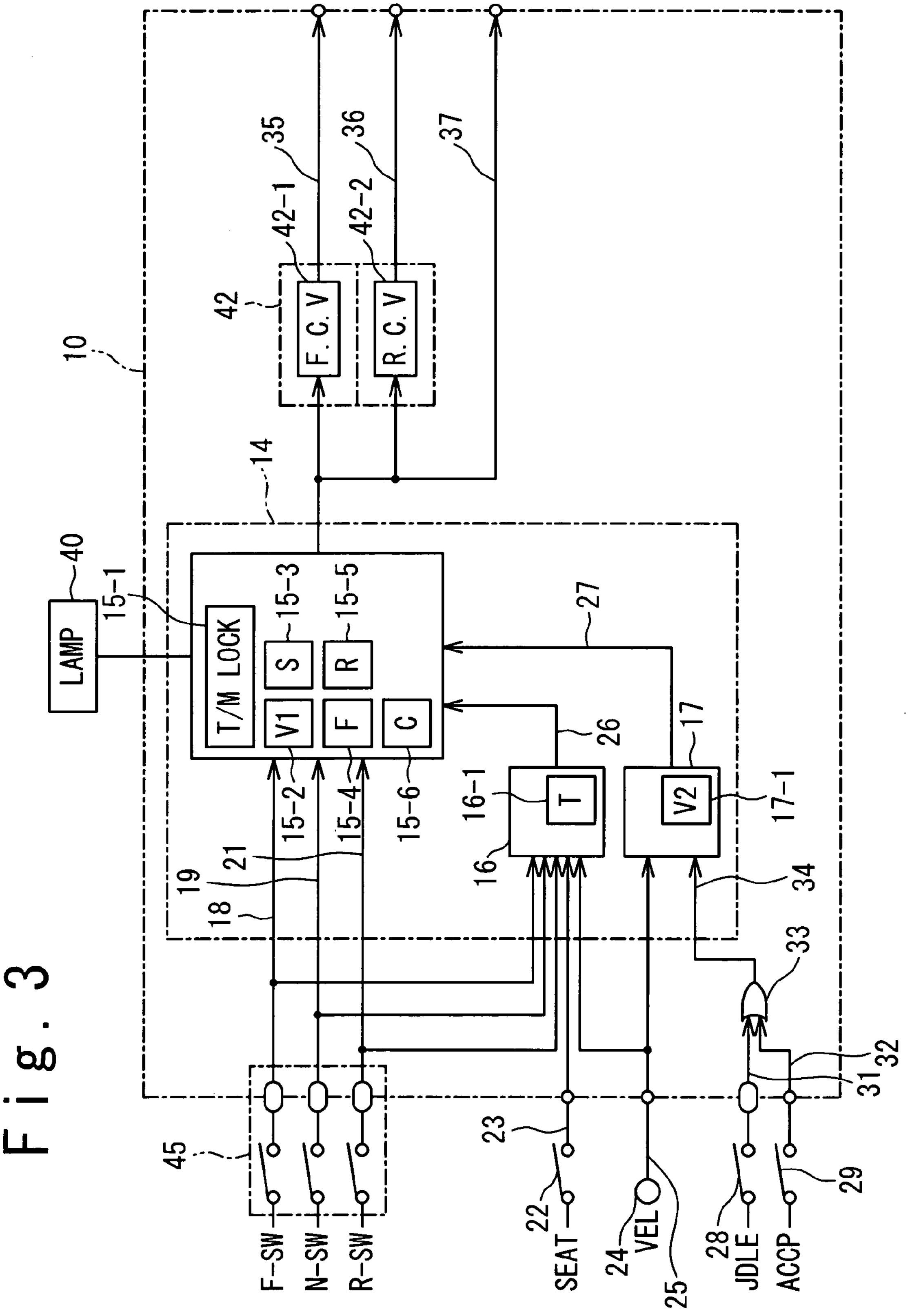
FIG. 3 is a circuit block diagram showing a control system of the self propelled industrial machine according to the present invention.

FIG. 3 is a block diagram showing the circuit configuration of a controller 10 arranged in a controller box which is accommodated in the self propelled vehicle body 1. The controller 10 is connected with three switches F-SW, N-SW and R-SW. Each of the three switches F-SW, N-SW and R-SW is a 2-position switch and has an ON state and an OFF state. The switch F-SW is related with a forward direction movement of the self propelled vehicle body 1, the switch N-SW is related with a neutral state, and the switch R-SW is related with a rear direction movement of the self propelled vehicle body 1. A signal F-SW 18 from the switch F-SW indicates permission or non-permission of forward direction movement in the self propelled vehicle body 1. A signal N-SW 19 from the switch N-SW indicates setting of the neutral state of the self propelled vehicle body 1. A signal R-SW 21 from the switch R-SW indicates permission or non-permission of rear direction movement in the self propelled vehicle body 1.

The controller 10 is also connected with a seat switch 22 provided for the seat 4. The seat switch 22 is embedded in the seat 4. The seat switch 22 outputs an operator presence signal 23 indicating that the operator is on the seat 4 of the self propelled vehicle body 1 based on the weight of the operator. The operator presence signal 23 takes a positive or negative voltage when being active, and a zero voltage when being inactive. The operator presence signal in the inactive state is referred to as an operator absence signal. The operator presence signal is used to secure safety, even when a problem is caused in the control system.

Also, the controller 10 is connected with the velocity sensor 24. The velocity sensor 24 detects the velocity of the self propelled vehicle body 1 and outputs a vehicle velocity signal 25.

Moreover, the controller 10 is connected with the idle switch 28 to supply an idle signal indicative of an engine being started, and the acceleration pedal switch 29 to supply a signal indicative of an acceleration pedal being footed.

The controller 10 is composed of a transmission (T/M) control logic circuit 15, a transmission lock logic circuit 16 and a creep control logic circuit 17. The transmission control logic circuit 15 is composed of a T/M lock flag 15-1, a first velocity threshold 15-2, a seat flag 15-3, an F flag 15-4, an R flag 15-5 and a creep flag C 15-6. The transmission control logic circuit 15 receives the signal F-SW 18, the signal N-SW 19 and the signal R-SW 21 from the above three switches F-SW, N-SW and R-SW. The transmission lock logic circuit 16 is composed of an operator absence delay (seat delay) timer 16-1. The transmission lock logic circuit 16 receives the signal F-SW 18, the signal N-SW 19 and the signal R-SW 21 from the above three switches F-SW, N-SW and R-SW, the operator presence signal 23 from the seat switch 22, and the vehicle velocity signal 25 from the velocity sensor 24. The transmission lock logic circuit 16 outputs a T/M lock control signal 26 to the transmission control logic circuit 15 based on the signal F-SW 18, the signal N-SW 19, the signal R-SW 21, the operator presence signal 23, and the vehicle velocity signal 25. The creep control logic circuit 17 is composed of a second velocity threshold 17-1. The creep control logic circuit 17 receives the vehicle velocity signal 25 from the velocity sensor 24, and a logical OR of the idle signal IDLE 31 from the switch 28 and an acceleration pedal signal 32 from the acceleration pedal switch 29. The creep control logic circuit 17 outputs a creep control signal 27 to the transmission control logic circuit 15 based on the vehicle velocity signal 25, the idle signal IDLE 31, and the acceleration pedal signal 32. The transmission control logic circuit 15 controls a forward direction movement control valve 42-1 and a rear direction movement control valve 42-2 for the transmission and outputs a neutral state indication signal 37, based on the signal F-SW 18, the signal N-SW 19, the signal R-SW 21, the creep control signal 27 and the T/M lock control signal 26.

Figure 4:
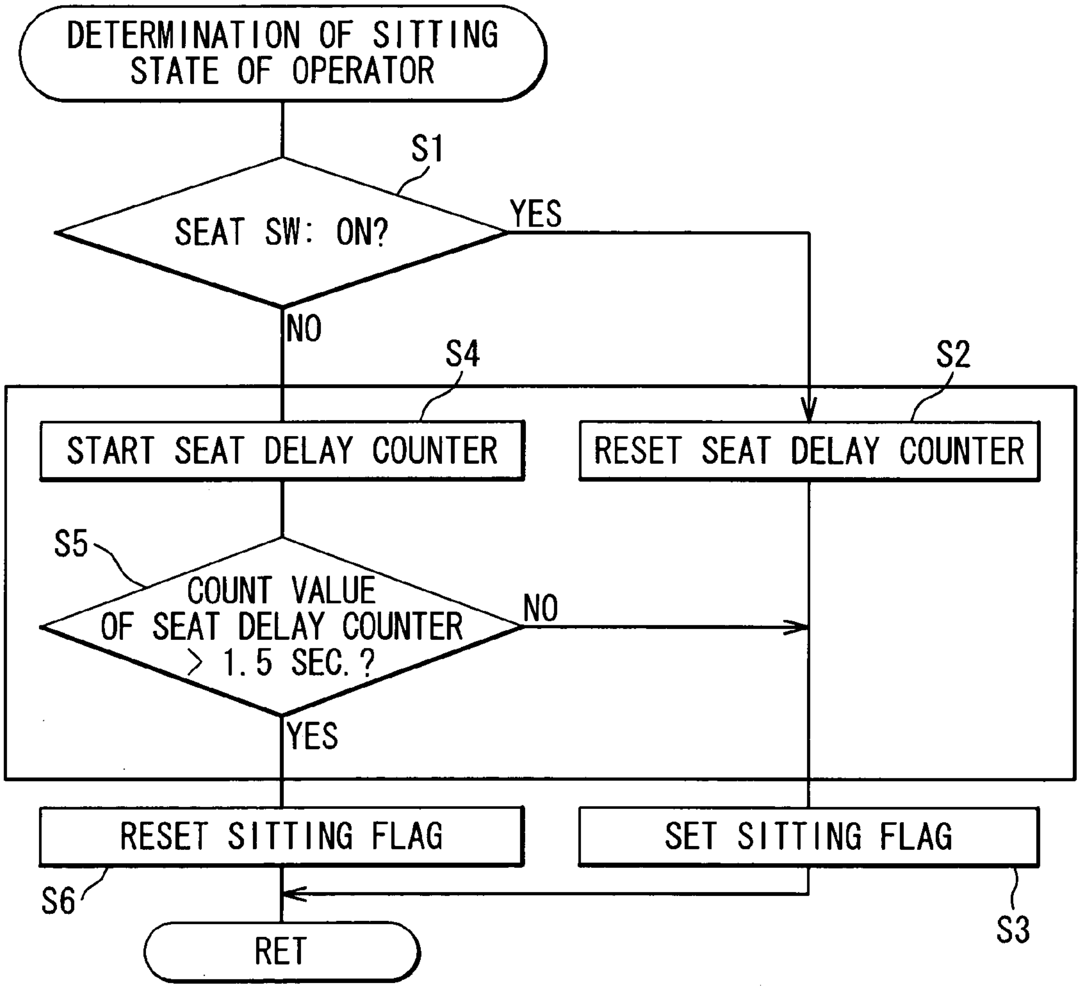
FIG. 4 is a flow chart showing a process of determining an operator presence state in the present invention.

FIG. 4 is a flow chart showing a process of generating the operator presence signal 23 in the transmission lock logic circuit 16. If the operator sits on the seat 4, the seat switch 22 switches to the ON state to generate the operator presence signal 23. The operator presence signal 23 is supplied to the transmission lock logic circuit 16. The transmission lock logic circuit 16 determines ON/OFF state of the seat switch 22 from the operator presence signal 23 at the step S1. When it is determined that the seat switch 22 is in the ON state, the transmission lock logic circuit 16 resets the operator absence delay timer 16-1 to zero at a step S2. In this case, however, the operator absence delay timer 16-1 does not start. Subsequently, the transmission lock logic circuit 16 outputs the T/M lock control signal 27 to the transmission control logic circuit 15 to set the seat flag (sitting flag) 15-3 of the transmission control logic circuit 15 at a step S3.

On the other hand, when it is determined at the step s1 that the seat switch 22 is in the OFF state, the transmission lock logic circuit 16 starts the operator absence delay timer 16-1 at a step S4. Subsequently, at a step S5, it is determined whether the measured time of the operator absence delay timer 16-2 is larger than a predetermined threshold time of 1.5 seconds. If the measured time is larger than the predetermined time, the transmission lock logic circuit 16 outputs the T/M lock control signal 26 to reset the seat flag 15-3 at a step S6. Also, if the measured time is not larger than the predetermined time, the transmission lock logic circuit 16 outputs the T/M lock control signal 26 to set the seat flag 15-3 at the step S3. In this way, the determination of the presence or absence of the operator on the seat is always carried out, and even if the operator leaves the seat 4, the detection state of the operator presence can be kept for the predetermined time of 1.5 seconds.

When the transmission lock logic circuit 16 determines the seat switch 22 in the OFF state or the operator absence state at the step S1, the operator absence delay timer 16-1 is started at the step S4. The operator absence delay timer 16-1 does not count the predetermined time at the step 5, when the transmission lock logic circuit 16 sets the operator presence flag at the step S3. As such a predetermined time, 1.5 seconds, is proper from a law of experience. Thus, when the operator stands up and gets off the self propelled vehicle body 1, the transmission lock logic circuit 16 sets the operator absence flag, i.e., resets the operator presence flag, 1.5 seconds after the time of standing-up time or getting-off.

Figure 5:
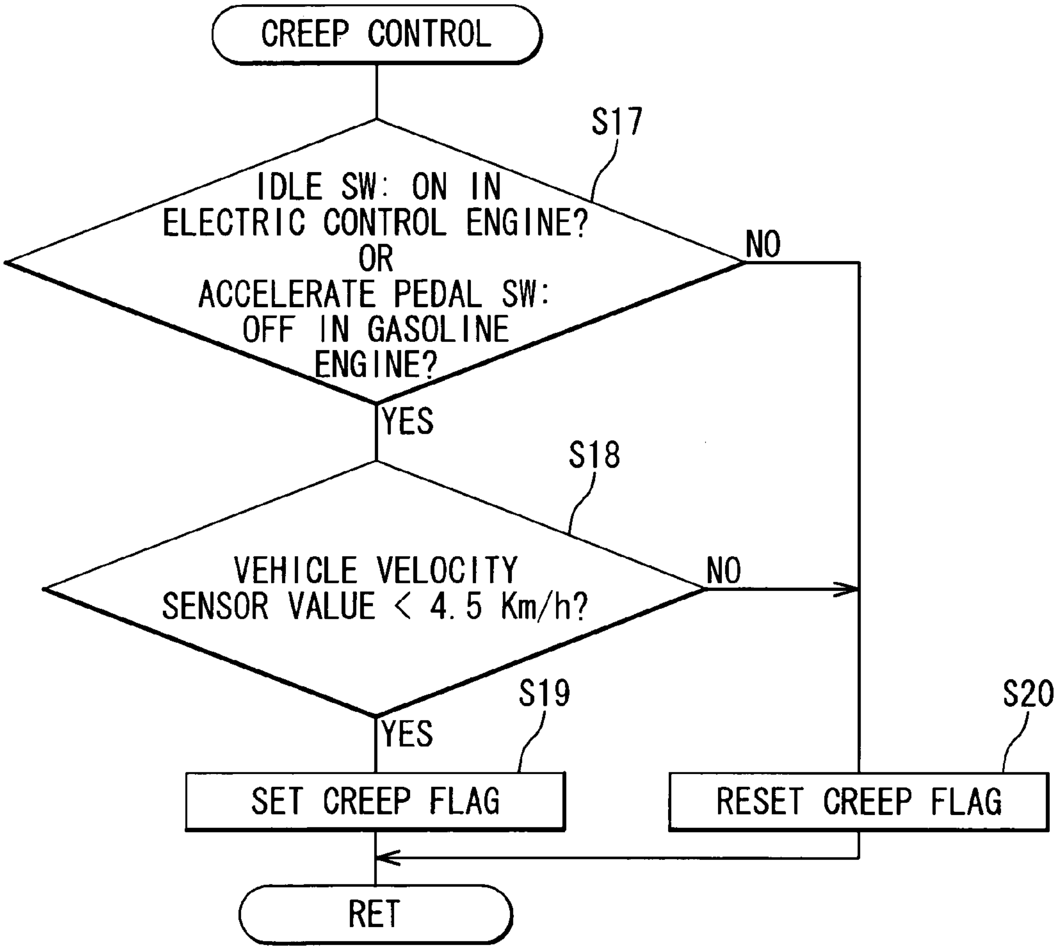
FIG. 5 is a flow chart showing a process of a creep control in the present invention.

FIG. 5 shows a creep control in the control system of the self propelled industrial machine according to the present invention. This control is added to avoid the creep running of the ATM (automatic transmission) for the purpose of adaptable to the CEN standard. When an electric engine (not shown) is started, the idle switch 28 is turned on, and the idle signal 31 in the ON state is supplied to an OR gate 33. In case that gasoline engine (not shown) is used in place of the electric engine, when the acceleration pedal is not footed, the acceleration pedal switch 29 is turned off, and the acceleration pedal signal 32 in the OFF state is supplied to the OR gate 33. The OR gate outputs an engine operation signal 34 to the creep control logic circuit 17. The vehicle velocity signal 25 is also supplied to the creep control logic circuit 17.

At a step S17, it is determined whether the idle signal 31 is in the ON state or the acceleration pedal signal 32 is in the OFF state. When the idle switch 28 is in the ON state or the accelerator switch 29 is in the OFF state, the creep control logic circuit 17 carries out a step S18. At the step S18, it is determined whether the vehicle velocity detected by the velocity sensor 24 is smaller than a second threshold velocity 17-1 of 4.5 km/h. When the detected vehicle velocity is smaller than the second threshold velocity 17-1, the creep control logic circuit 17 outputs the creep control signal 27 at a step S19 to set the creep flag 17-1 of the transmission control logic circuit 15 to avoid the creep running. In case that the idle switch 28 is in the OFF state or the accelerator switch 29 is in the ON state at the step S17, and in case that the detected vehicle velocity is not smaller than 4.5 km/h, the creep control logic circuit 17 outputs the creep control signal 27 at the step S20 to reset the creep flag 15-6.

Figure 6:
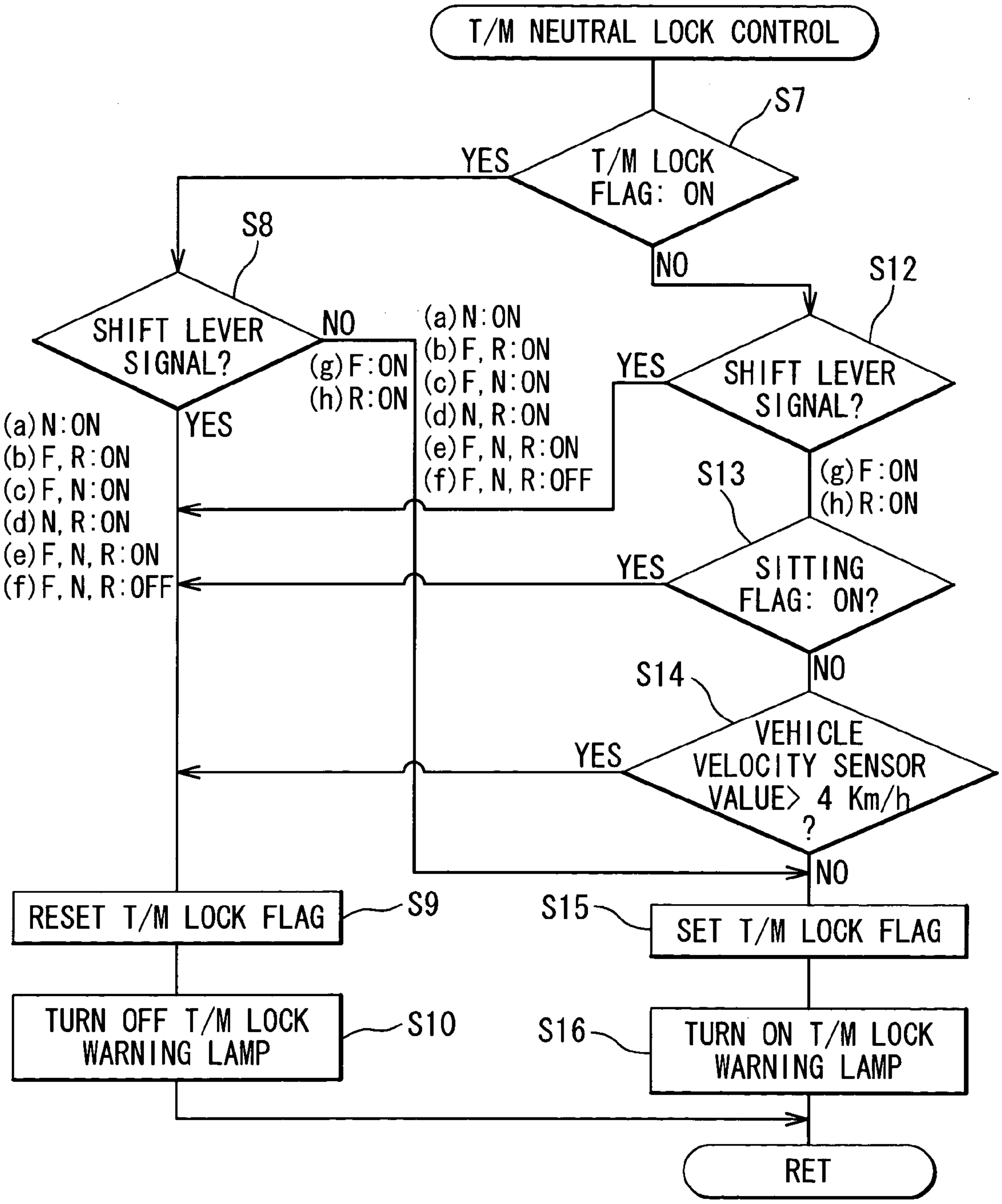
FIG. 6 is a flow chart showing a process of neutral control in the self propelled industrial machine in the present invention.

FIG. 6 is a flow chart showing a process of T/M neutral lock control in transmission control logic circuit 15 of the control system of the self propelled industrial machine according to the embodiment of the present invention. A transmission lock flag (T/M lock flag) 15-1 is set initially when the operation of the forklift is started. At a step S7, it is determined whether the T/M lock flag 15-1 is set. When it is determined that the T/M lock flag 15-1 is set, a step S8 is carried out, and when it is determined that the T/M lock flag 15-1 is not set, a step S12 is carried out. In the steps S8 and S12, the statuses of the switches F-SW, N-SW and R-SW are checked. When the switch F-SW is set, the status is in the forward direction movement permission state (F: ON) and when the switch F-SW is not set, the status is in the forward direction movement non-permission state (F: OFF). When the switch N-SW is set, the status is in the neutral state (N: ON) and when the switch N-SW is not set, the status is in the non-neutral state (N: OFF). When the switch R-SW is set, the status is in the rear direction movement permission state (R: ON) and when the switch R-SW is not set, the status is in the rear direction movement non-permission state (R: OFF). The switches can take the following sets of operation statuses:

(a) N: ON (b) F and R: ON (c) F and N: ON (d) N and R: ON (e) F, N and R: ON (f) F, N and R: OFF (g) F: ON (h) R: ON In the signal state (a), the switch N-SW is in the ON state, and therefore the transmission state is kept to the neutral state actually. In the signal state (b), the switch F-SW and the switch R-SW are both in the ON state, and therefore the forward direction movement and the rear direction movement are permitted. In the signal state (c), the switch F-SW and the switch N-SW are both in the ON state, and therefore the forward direction movement is permitted while the transmission state is in the neutral state. In the signal state (d), the switch R-SW and the switch N-SW are both in the ON state, and therefore the rear direction movement is permitted while the transmission state is in the neutral state. In the signal state (e), the switch F-SW, the switch N-SW and the ON/OFF switch R-SW are all in the ON state, and therefore the forward and rear direction movements are permitted while the transmission state is in the neutral state. In the signal state (f), the switch F-SW, the switch N-SW and the switch R-SW are all in the OFF state, and therefore the forward and rear direction movements are not permitted and the transmission state is undefined. In the signal state (g), the switch F-SW is in the ON state, and therefore the forward direction movement is permitted. In the signal state (h), the switch R-SW is in the ON state, and therefore the rear direction movement is permitted.

At the steps S8 or S12, when at least the switch N-SW is set to the ON state, all of the switches F-SW, N-SW and R-SW are not set to the OFF state, or the switches F-SW and R-SW are set to the ON state, a step S9 is carried out. At the step S9, the T/M lock flag 15-1 is reset to cancel a lock state. That is, the automatic transmission is set to an operation possible state. At a step S10, a T/M lock warning lamp 40 disappears and the process of the T/M neutral state lock control for one cycle is ended and the control flow returns to the step S7.

When it is determined at the step S12 that the switch N-SW is not in the ON state or in an undefined state and the switch F-SW or the switch R-SW is in the ON state, that is, when the signal state is in (g) or (h), a step S13 is carried out. At the step S13, the state of the seat flag (sitting flag) S 15-3 is checked. When the seat flag 15-3 is in the ON state at the step S13, a step S14 is carried out to check whether the detected vehicle velocity is larger than the first threshold velocity of 4 Km/h. When it is determined at the step S14 that the detected vehicle velocity is not larger than the first threshold velocity of 4 Km/h, a step S15 is carried out and the T/M lock flag 15-1 is set. Subsequently, a step S16 is carried out to turn on the T/M lock warning lamp 40.

When it is determined at the step S8 that the switch N-SW is not in the ON state or in the undefined state and the switch F-SW or the switch R-SW is in the ON state, that is, when the signal state is in (g) or (h), the above steps S15 and S16 are carried out.

Also, when it is determined at the step S13 that the seat flag 15-3 is in the ON state, or when it is determined at the step S14 that the detected vehicle velocity is larger than the first threshold velocity of 4 Km/h, the above steps S9 and S10 are carried out.

In this way, when the seat flag 15-3 is in the ON state, the detected vehicle velocity is larger than the first threshold velocity of 4 Km/h, and the switch N-SW is in the ON state or all of the switches F-SW, N-SW and R-SW are in the OFF state, and the switches F-SW and R-SW are both in the ON state, the T/M lock flag 15-1 is reset so that the running of the forklift is permitted. On the other hand, when the seat flag 15-3 is not in the ON state, the detected vehicle velocity is not larger than the first threshold velocity 15-2 of 4 Km/h, or the switch N-SW is not in the ON state or in the undefined state and the switch F-SW or and R-SW are set to the ON state, the T/M lock flag 15-1 is set so that the running of the forklift is prohibited.

In the control flow chart shown in FIG. 4, the seat flag 16-1 is kept in the ON state during the time period of 1.5 seconds after the operator leaves from the seat 4. During the period, it is not necessary for the operation of the transmission to be prohibited based on the seat switch 22. Thus, even if such a period exists, it can be avoided effectively that the operator suffers damage from the self propelled vehicle body 1 when the operator notices unusual happening of a load state on the forklift, gets off the forklift and approaches the running forklift. The setting of about 1.5 seconds is effective as the longest time when the operator gets off the vehicle body, and the operator approaches on the front side into the direction of the movement of the vehicle body, from a law of experience. When the operator gets off the forklift after a delay by the predetermined time, the self propelled vehicle body 1 is in the movement non-permission state, since the T/M lock flag 15-1 is set. Thus, an accident between the self propelled vehicle body and the operator can be effectively avoided. In this way, a running control state is not changed during which the operator stands up and confirms the peripheral environment.

Also, when the detected vehicle velocity is larger than the first threshold velocity 15-2, the self propelled vehicle body 1 is running as usual. Therefore, the T/M lock flag 15-1 is reset. When the detected vehicle velocity is not larger than the first threshold velocity 15-2, there is a possibility of the creep running and the T/M lock flag 15-1 is set.

In this way, a running control can be carried out based on the T/M lock flag 15-1.

Figure 7:
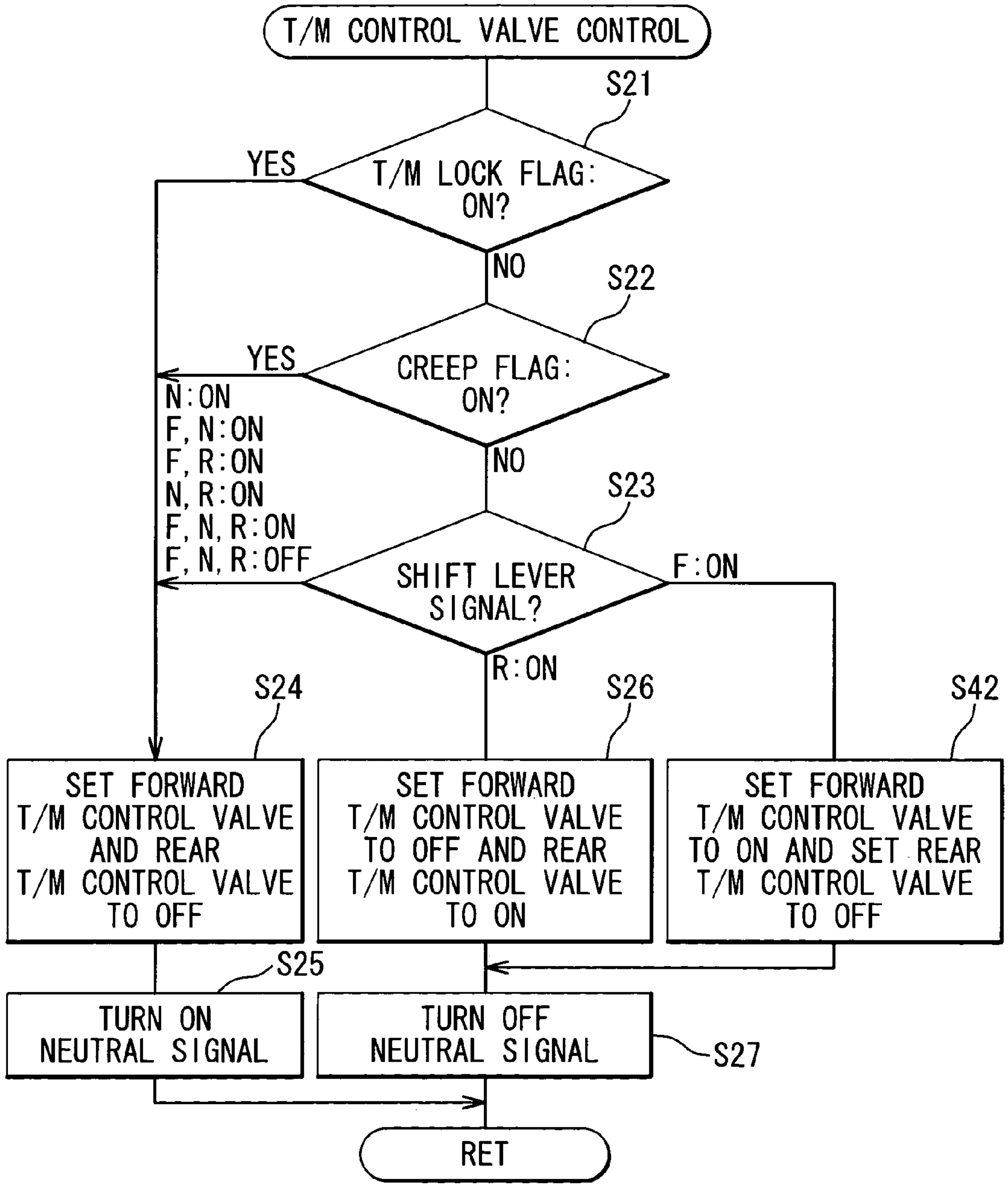
FIG. 7 is a flow chart showing a process of a running control in the self propelled industrial machine according to a first embodiment of the present invention.

FIG. 7 is a flow chart showing a process of T/M control valve control in the self propelled industrial mechanical according to the first embodiment of the present invention. In the first embodiment, the electric engine is used and the switches F-SW, N-SW and R-SW are connected with the shift lever 11.

At a step S21, it is determined whether the T/M lock flag 15-1 is in the ON state, that is, whether the transmission is in the lock state is checked. When it is determined that the T/M lock flag 15-1 is in the ON state, a step S24 is carried out such that the T/M control logic circuit 15 controls the control valves 42-1 and 42-2 of the hydraulic unit 42 for the transmission to prohibit the vehicle body 1 to run in the forward or rear direction. Then, the neutral signal 37 is turned on at a step S25.

When it is determined that the T/M lock flag 15-1 is not in the ON state, a step S22 is carried out to check whether the creep flag 15-6 is in the ON state. When it determined that the creep flag 15-6 is in the ON state, the above steps S24 and S25 are carried out to prevent the creep operation.

When it is determined that the creep flag 15-6 is not in the ON state, a step S23 is carried out to check the states of the switches F-SW, N-SW and R-SW. The switches can take the following operation states:

(a) N: ON (b) F and R: ON (c) F and N: ON (d) N and R: ON (e) F, N and R: ON (f) F, N and R: OFF (g) F: ON (h) R: ON, as described above. When it is determined at the step S23 that the switch N-SW is set to the ON state, all of the switches F-SW, N-SW and R-SW are not in the ON state, or the switches F-SW and R-SW are in the ON state, that is, when the switch states are in either of (a) to (f), the above steps S24 and S25, are carried out to prevent the creep operation.

In this way, the control to the control valves 42 of the hydraulic unit for the transmission is carried out, and the neutral signal 37 is turned on to secure safety.

When it is determined at the step S23 that the switch N-SW is in the OFF state or an undefined state and the switch R-SW is in the ON state (the state corresponding to (h)), a step S26 is carried out such that the transmission control logic circuit 15 controls the control valve 42-1 of the hydraulic unit for the transmission to prohibit the vehicle body 1 to run in the forward direction (to set the control valve 42-1 to the OFF state) and the control valve 42-2 of the hydraulic unit for the transmission to permit the vehicle body 1 to run in the rear direction (to set the control valve 42-2 to the ON state). Then, the neutral signal 37 is turned off at a step S27.

When it is determined at the step S23 that the switch N-SW is in the OFF state or an undefined state and the switch F-SW is in the ON state (the state corresponding to (g)), a step S42 is carried out such that the transmission control logic circuit 15 controls the control valve 42-1 of the hydraulic unit for the transmission to permit the vehicle body 1 to run in the forward direction (to set the control valve 42-1 to the ON state) and the control valve 42-2 of the hydraulic unit for the transmission to prohibit the vehicle body 1 to run in the rear direction (to set the control valve 42-2 to the OFF state). Then, the neutral signal 37 is turned off at the step S27.

In this way, the neutral control is carried out once and then the running control is carried out.

Figure 8:
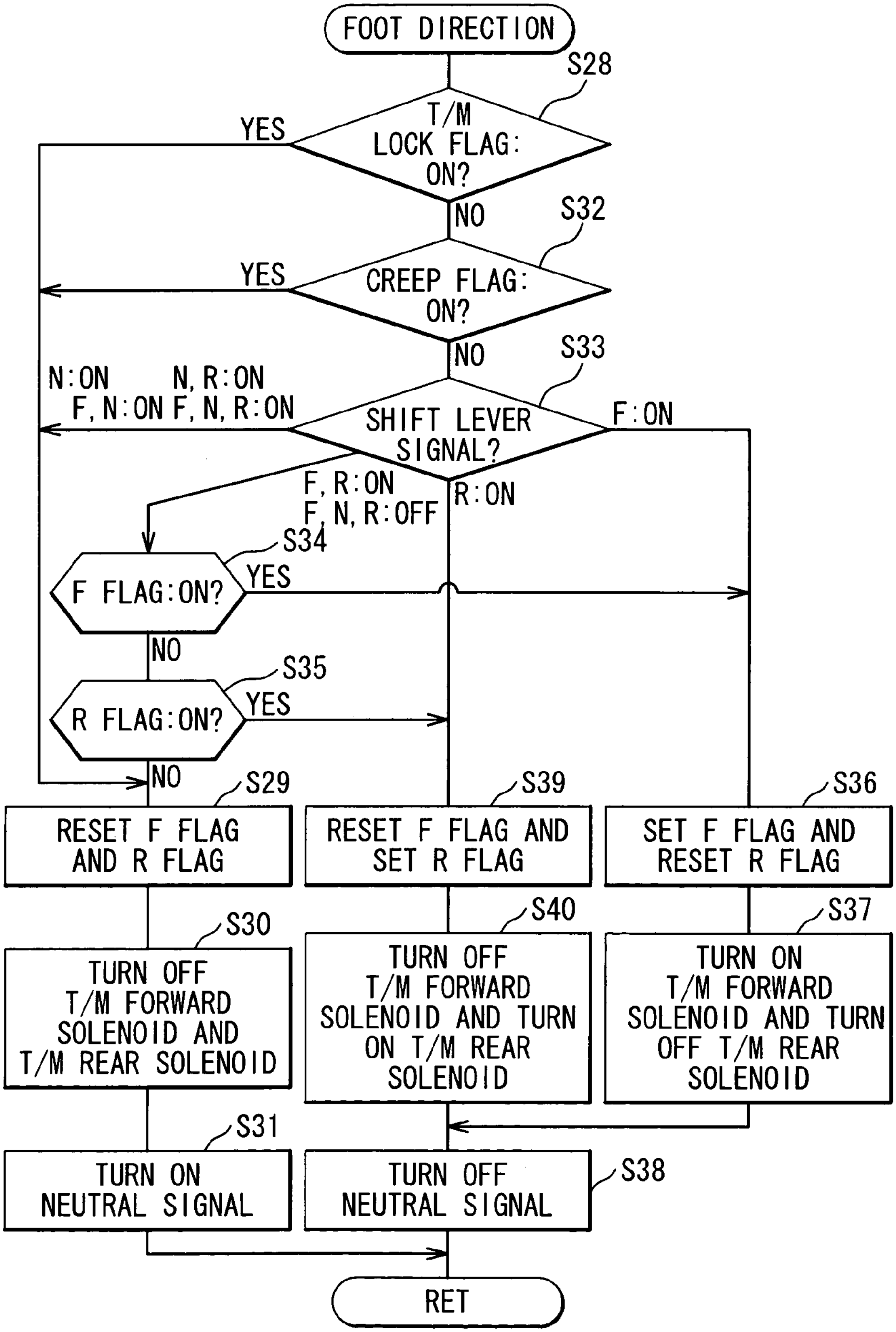
FIG. 8 is a flow chart showing a process of a running control in the self propelled industrial machine according to a second embodiment of the present invention.

FIG. 8 is a flow chart showing a process of foot direction control in the self propelled industrial mechanical according to the second embodiment of the present invention. In the second embodiment, a gasoline engine is used, and the switch N-SW is provided for the shift lever 11, but the switches F-SW and R-SW are provided for pedal or pedals (not shown) to be footed by the operator. The switches F-SW and R-SW are not provided for the shift lever 11. Also, solenoids 42-1 and 42-2 are provided for the hydraulic unit for the transmission instead of the control valves 42-1 and 42-2 for the forward and rear direction movements.

At a step S28, whether the T/M lock flag 15-1 is in the ON state, that is, the transmission is in the lock state is checked. When it is determined that the T/M lock flag 15-1 is in the ON state, a step S29 is carried out to reset a F flag 15-4 and a R flag 15-5 of the transmission control logic circuit 15. Then, a step S30 is carried out such that the transmission control logic circuit 15 controls the solenoids 42-1 and 42-2 of the hydraulic unit for the transmission to prohibit the vehicle body 1 to run in the forward or rear direction. Then, the neutral signal 37 is turned on at a step S31.

When it is determined that the T/M lock flag 15-1 is not in the ON state, a step S32 is carried out to check whether the creep flag 15-6 is in the ON state. When it determined that the creep flag 15-6 is in the ON state, the above steps S29 to S31 are carried out to prevent the creep operation.

When it is determined that the creep flag 15-6 is not in the ON state, a step S33 is carried out to check the states of the switches F-SW, N-SW and R-SW. The switches can take the following operation states:

(a) N: ON (b) F and R: ON (c) F and N: ON (d) N and R: ON (e) F, N and R: ON (f) F, N and R: OFF (g) F: ON (h) R: ON, as described above.

When it determined at the step S33 that the states of the switches are in (a), (c), (d), or (e), that is, the switch N-SW is set to the ON state, the above steps S29 to S31 are carried out to prevent the creep operation.

When it determined at the step S33 that the statuses of the switches are in (b) or (f), that is, the switches F-SW and R-SW are set to the ON state and the switch N-SW is set to an undefined state, or all the switches F-SW, N-SW and R-SW are set to the OFF state, a step S34 is carried out to check whether the F flag 15-4 is set. When the F flag 15-4 is not in the ON state, a step S35 is carried out to check whether the R flag 15-5 is set. When the R flag 15-5 is not in the ON state, the above steps S29 to S31 are carried out to prevent the creep operation.

When it is determined at the step S33 that the switch N-SW is in the OFF state or an undefined state and the switch R-SW is in the ON state, i.e., the state is in (h), a step S39 is carried out to reset the F flag 15-4 and to set the R flag 15-5. Then, a step S40 is carried out such that the transmission control logic circuit 15 controls the solenoid 42-1 of the hydraulic unit for the transmission to prohibit the vehicle body 1 to run in the forward direction and the solenoid 42-2 of the hydraulic unit for the transmission to permit the vehicle body 1 to run in the rear direction. Then, the neutral signal 37 is turned off at a step S38.

Also, when it is determined at the step S35 that the R flag 15-5 is in the ON state, the above steps S39, S40 and S38 are carried out.

When it is determined at the step S33 that the switch N-SW is in the OFF state or an undefined state and the switch F-SW is in the ON state, i.e., the state is in (g), a step S36 is carried out to set the F flag 15-4 and to reset the R flag 15-5. Then, a step S37 is carried out such that the transmission control logic circuit 15 controls the solenoid 42-1 of the hydraulic unit for the transmission to permit the vehicle body 1 to run in the forward direction and the solenoid 42-2 of the hydraulic unit for the transmission to prohibit the vehicle body 1 to run in the rear direction. Then, the neutral signal 38 is turned on at a step S38.

Also, when it is determined at the step S34 that the F flag 15-4 is in the ON state, the above steps S36, S37 and S38 are carried out.

In this way, according to necessity, the control to the solenoids valves 42 of the hydraulic unit for the transmission are prohibited, the neutral signal 37 is turned on to secure safety.

The control system of the self propelled industrial machine according to the present invention shifts to the neutral state such that the electric system and the mechanical system are always on the safety side under the vehicle velocity, the creep state, and the operator presence/absence state. The function directing to safety is surely enhanced under the desirable limitation state.

In the above description, the shift lever is used in the first embodiment and the pedals are used in the second embodiment. However, the shift lever and the pedals may be both used at the same time. In this case, one of the switches for the shift lever and the switches for the pedals may be used with a priority, or the forward or rear direction movement instruction may be connected the switch F-SW or R-SW in a logical OR. Such a modification is obvious to a person in the art and the modification is contained in the present invention.

What is claimed is:

1. A self propelled industrial machine comprising:

a self propelled vehicle body;

a transmission installed in said self propelled vehicle body;

an operator presence detection switch provided to generate an operator presence or absence signal relating to an operator on a seat arranged on said self propelled vehicle body;

a velocity sensor provided to detect a velocity of said self propelled vehicle body; and a control unit provided to compare the detected velocity and a first predetermined velocity, provided to set a transmission lock state in response to said operator absence signal when the detected velocity is smaller than said first predetermined velocity, and provided to set said transmission to a neutral state when said transmission lock state is set.

2. The self propelled industrial machine according to claim 1, wherein said operator presence signal is active during a period while the operator is on said seat and a predetermined period after the operator leaves said seat, and said operator absence signal is active when said operator presence signal is inactive.

3. The self propelled industrial machine according to claim 1, wherein said control unit comprises:

an engine signal generator provided to generate an engine signal when an engine is started or an acceleration pedal is not pressed, and wherein said control unit sets said transmission to said neutral state in response to said engine signal when the detected velocity is smaller than a second predetermined velocity, wherein said first predetermined velocity is smaller than said second predetermined velocity.

4. The self propelled industrial machine according to claim 1, further comprising:

a first switch provided to instruct a forward direction movement;

a second switch provided to instruct said neutral state; and a third switch provided to instruct a rear direction movement, wherein said control unit releases said transmission lock state when said second switch is turned on, in a state that said first and third switches are all turned off, and said first and third switches are turned on with said second switch being turned off.

5. The self propelled industrial machine according to claim 4, wherein said control unit controls said transmission to said neutral state when said second switch is turned on, said first and third switches are turned off, and controls said transmission such that the forward or rear direction movement is carried out when said first switch or said third switch is turned on, respectively, and said second switch is turned off.

6. A control method in a self propelled industrial machine with a self propelled vehicle body and a transmission, comprising:

generating an operator presence or absence signal relating to an operator on a seat arranged on the self propelled vehicle body;

detecting a velocity of said self propelled vehicle body;

comparing the detected velocity and a first predetermined velocity;

setting a transmission lock state in response to said operator absence signal when the detected velocity is smaller than said first predetermined velocity; and controlling said transmission to a neutral state when said transmission lock state is set.

7. The control method according to claim 6, wherein said operator presence signal is active during a period while the operator is on said seat and a predetermined period after the operator leaves said seat, and said operator absence signal is active when said operator presence signal is inactive.

8. The control method according to claim 6, further comprising:

generating an engine signal when an engine is started or an acceleration pedal is not pressed, and wherein said controlling comprises:

controlling said transmission to said neutral state in response to said engine signal when the detected velocity is smaller than a second predetermined velocity, and said first predetermined velocity is smaller than said second predetermined velocity.

9. The control method according to claim 6, further comprising:

generating a forward direction movement instruction;

generating a neutral state instruction;

generating a rear direction movement instruction; and releasing said transmission lock state when (a) said neutral state instruction is generated, (b) said forward and rear direction movement instructions are not generated, or (c) said forward and rear direction movement instructions are generated and said neutral state instruction is not generated.

10. The control method according to claim 9, further comprising:

controlling said transmission to said neutral state in response said generating of a neutral state instruction, when said forward and rear direction movement instructions are not generated; and controlling said transmission in response to said forward or rear direction movement instruction such that the forward or rear direction movement is carried out.

* * * * *